(12) United States Patent
Yata

(10) Patent No.: US 6,951,141 B2
(45) Date of Patent: Oct. 4, 2005

(54) MEASURING METHOD AND MEASURING APPARATUS

(75) Inventor: Hideo Yata, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/791,121

(22) Filed: Mar. 2, 2004

(65) Prior Publication Data

US 2004/0211266 A1 Oct. 28, 2004

(30) Foreign Application Priority Data

Apr. 22, 2003 (JP) .................................... 2003-116831

(51) Int. Cl.⁷ ................................................ G01F 1/30
(52) U.S. Cl. ................................................ 73/861.73
(58) Field of Search ................... 73/861.73; 209/636, 209/193; 141/4; 222/55, 371

(56) References Cited

U.S. PATENT DOCUMENTS

| | | | | |
|---|---|---|---|---|
| 3,945,532 A | * | 3/1976 | Marks | 222/55 |
| 5,280,813 A | * | 1/1994 | Jackson | 141/4 |
| 5,681,999 A | * | 10/1997 | Pollano et al. | 73/861.73 |
| 5,887,728 A | * | 3/1999 | Muranaka et al. | 209/636 |
| 5,938,074 A | | 8/1999 | Dartus | |

FOREIGN PATENT DOCUMENTS

| | | |
|---|---|---|
| CN | 2532466 Y | 1/2003 |
| JP | 07-311077 | 11/1995 |
| JP | 2003-057099 | 2/2003 |

\* cited by examiner

*Primary Examiner*—Edward Lefkowitz
*Assistant Examiner*—Jewel V. Thompson
(74) *Attorney, Agent, or Firm*—Keating & Bennett, LLP

(57) ABSTRACT

A method of measuring material in which the material is conveyed by a conveying unit and dropped from a discharge portion of the conveying unit to be supplied into a measuring unit arranged under the discharge portion, and is measured by the measuring unit, includes a first supplying step of supplying the material through the discharge portion into the measuring unit until a quantity of the material measured by the measuring unit reaches a preparatory target value which is small compared to a final measuring target value of the material, and a second supplying step of receiving a portion of the material to be supplied through the discharge portion into the measuring unit on the way to where the material is dropped for recovery, whereby the material is supplied through the discharge portion into the measuring unit at a supplying rate that is smaller than that in the first supplying step, wherein the material is stopped from being supplied through the discharge portion into the measuring unit at a time when the quantity of the material measured by the measuring unit reaches the final measuring target value.

15 Claims, 11 Drawing Sheets

CONTROL MEANS

MEASURING METHOD AND MEASURING APPARATUS

BACKGROUND OF THE INVENTION

1. Field of the Invention

The present invention relates to a measuring method useful when a predetermined quantity of particulate material such as chip devices, powder, or the like is measured to be removed and, moreover, the present invention relates to a measuring apparatus.

2. Description of the Related Art

To measure material which is being conveyed, with high accuracy in a short measuring-time, it is rational that the conveying rate of the material is high until the quantity of the measured material reaches a final measuring target value, and the conveying rate is low when the quantity of the measured material reaches the final measuring target value. Specifically, as a means for carrying out the above-described measurement, it is proposed that the conveying speed of a conveying unit at which material to be measured is conveyed is controlled so that conveying of the material at a large conveying rate and that at a very small conveying rate are changed from one to the other. In addition, it is supposed that a device for conveying material at a large conveying rate and a device for conveying the material at a very small conveying rate are equipped, and moreover, means for selecting these devices is provided. Japanese Unexamined Patent Application Publication No. 7-311077 (Patent Document 1) discloses means for carrying out the above-described measurement using the selection of the devices.

Referring to controlling the conveying-speed of the conveying unit so that the conveying rates are changed as described above, it is advantageous that only one type of conveying unit is required. However, it is difficult to uniformly convey material at a very small conveying rate by means of the conveyor. Furthermore, to decrease the conveying rate to the very small conveying rate, the conveying speed must be decreased. Thus, it takes much time for a required quantity of the material to be measured for removal. Thus, as a whole, it takes much time to carry out the overall measuring process. As a result, the efficiency of the entire process is greatly reduced.

According to the known means disclosed in Patent Document 1, parts can be measured to be removed with high accuracy, compared to the measurement of parts in which the weight of parts fed through a single hopper is measured, and a predetermined quantity of the parts are removed. However, according to this known means, the apparatus is large in size and also, is voluminous as a whole, so that the space required for the installation of the apparatus is large. Moreover, the apparatus is expensive. Therefore, the above-described means is unsuitable for measurement of a predetermined relatively small quantity of material which is to be removed.

SUMMARY OF THE INVENTION

In order to overcome the problems described above, preferred embodiments of the present invention provide a measuring method and a measuring apparatus having a simple structure and greatly reduced size, with which high-accuracy measurement can be carried out in a short time, and which can be effectively applied to the measurement of a predetermined quantity of material to be removed.

According to a first preferred embodiment of the present invention, a method of measuring a material in which the material is conveyed by a conveying unit and dropped from a discharge portion of the conveying unit to be supplied into a measuring unit arranged under the discharge portion, and is measured by the measuring unit, includes a first supplying step of supplying the material from the discharge portion into the measuring unit until the quantity of the material measured by the measuring unit reaches a preparatory measuring target value which is relatively small compared to a final measuring target value of the material, and a second supplying step of receiving a portion of the material to be supplied through the discharge portion into the measuring unit on the way to where the material is dropped for recovery, whereby the material is supplied through the discharge portion into the measuring unit at a supplying rate that is smaller than that in the first supplying step, wherein the material is stopped from being supplied through the discharge portion into the measuring unit when the quantity of the material measured by the measuring unit reaches the final measuring target value.

According to the method of measuring material of a preferred embodiment of the present invention, in the first supplying step, all of the material to be measured, dropped from the discharge portion of the conveying unit is supplied into the measuring unit until the quantity of the material measured by the measuring unit reaches the preparatory measuring target value. In the second supplying step, only a portion of the material conveyed to the discharge portion is supplied into the measuring unit, and the other portion thereof is received and recovered. The material is stopped from being supplied through the discharge portion into the measuring unit when the quantity of the material measured in the measuring unit reaches the final measuring target value. Thus, the measurement of a predetermined quantity of the material to be removed out is completed. In the second supplying step, it is not necessary to decrease the conveying speed of the conveying unit. In the second supplying step, the quantity of the material dropped from the discharge portion and supplied into the measuring unit is decreased by the quantity of the material received for recovery. Thus, the quantity of the material measured by the measuring unit, when the quantity approaches the final measuring target value, is increased little by little. Therefore, the material can be stopped from being supplied with very high accuracy. Thus, a predetermined quantity of the material can be supplied into the measuring unit within a tolerance range of the quantity. The expression, "the material is dropped from the discharge portion and is supplied into the measuring unit", includes the material that is being dropped and supplied, and also the material that is caused to flow down through an inclined feeding route from the discharge portion into the measuring unit.

Thereafter, the next measurement is carried out. All of the material dropped from the discharge portion of the conveying unit is supplied into the measuring unit arranged under the discharge portion until the quantity of the material measured by the measuring unit reaches the preparatory measuring target value in the first supplying step. The material received for recovery in the preceding second supplying step may be added to the material supplied through the discharge portion of the conveying unit into the measuring unit. In other words, the received material may be added at the initial time of the present measurement. Thus, the quantity of the material measured by the measuring unit reaches the preparatory measuring target value in a shorter time period.

According to a second preferred embodiment of the present invention, a measuring apparatus includes a conveying unit having a conveying member for conveying material to be measured, and a discharge portion from which the material conveyed by the conveying member is discharged, a measuring unit for measuring the material dropped from the discharge portion and supplied therein, a stocking mechanism arranged between the discharge portion and the measuring unit, the stocking mechanism being controlled so that the off-state and the on-state of the mechanism are changed over to each other, the off-state being such that the stocking mechanism recedes from the path along which the material drops so that the dropping of the material is not disturbed, the on-state being such that the stocking mechanism advances into the path along which the material drops so that a portion of the material can be received for recovery, a controller adapted to capture measurement data obtained in the measuring unit and to control the stocking mechanism based on the data, whereby the controller controls the stocking mechanism such that the stocking mechanism is set in the off-state until the quantity of the material measured by the measuring unit reaches a preparatory measuring target value which is smaller than a final measuring target value of the material, the controller controls the stocking mechanism such that the stocking mechanism is in the on-state after the quantity of the material measured by the measuring unit reaches the preparatory measuring target value, and the controller stops the material from being supplied to the measuring unit through the discharge portion when the quantity of the material measured by the measuring unit reaches the final measuring target value.

According to the measuring apparatus of a preferred embodiment of the present invention, all of the material to be measured, dropped from the discharge portion of the conveying unit is supplied into the measuring unit until the quantity of the material measured by the measuring unit reaches the preparatory measuring target value, which is smaller than the final measuring target value. After the quantity of the material measured by the measuring unit reaches the preparatory target value, only a portion of the material conveyed to the discharge portion is supplied into the measuring unit, and the other portion thereof is received for recovery in the stocking mechanism which is in the on-state. The material is stopped from being supplied through the discharge portion into the measuring unit when the quantity of the material measured in the measuring unit reaches the final measuring target value. Thus, the measurement of a predetermined quantity of the material to be removed is completed. When the stocking mechanism is in the on-state, the supplying rate of the material dropped from the discharge portion and supplied into the measuring unit becomes smaller by the receiving rate of the material at which the material is received for recovery. Thus, the quantity of the material measured by the measuring unit, when the quantity approaches the final measuring target value, is increased little by little. Therefore, the material can be stopped from being supplied with high accuracy. Thus, a predetermined quantity of the material can be supplied into the measuring unit within a tolerance range of the quantity. The expression, "the material is dropped from the discharge portion and is supplied into the measuring unit", includes the material that is dropped and supplied, and also, the material that is caused to flow down through an inclined feeding-route from the discharge portion into the measuring unit.

Then, in the next measurement, all of the material dropped from the discharge portion of the conveying unit is supplied into the measuring unit arranged under the discharge portion until the quantity of the material measured by the measuring unit reaches the preparatory measuring target value. The material received for recovery in the preceding measurement may be added to the material which is supplied through the discharge portion of the conveying unit into the measuring unit. The received material may be added at the initial time of the present measurement. Thus, the quantity of the material measured by the measuring unit can be caused to reach the preparatory measuring target value in a short period of time.

Thus, according to various preferred embodiments of the present invention, the measurement can be carried out with high accuracy, and also, the time required for the subsequent measurement can be reduced.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Figure 1:
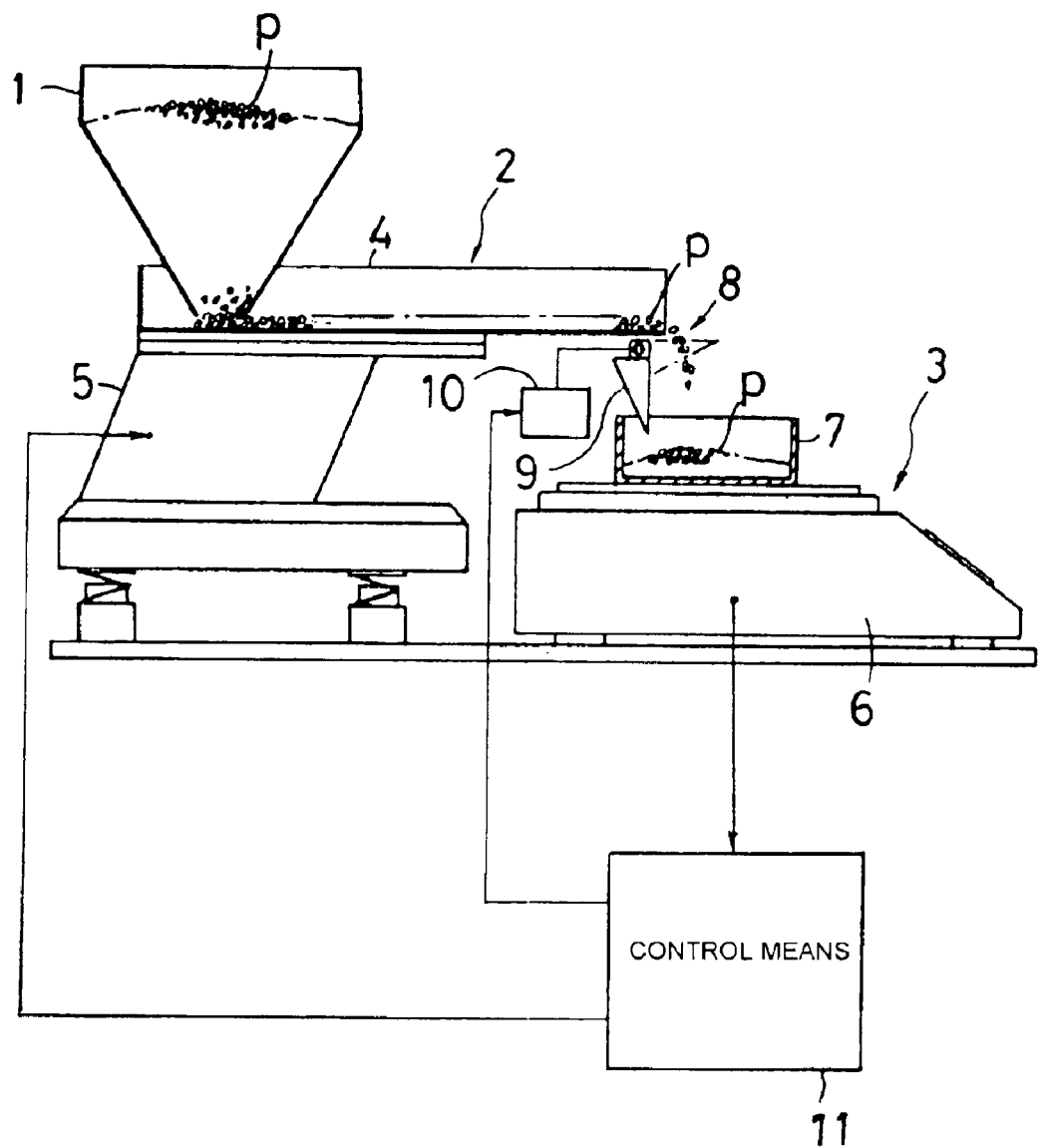
FIG. 1 is a schematic view showing the structure of a measuring apparatus which carries out a measuring method according to a first preferred embodiment of the present invention.
Figure 2:
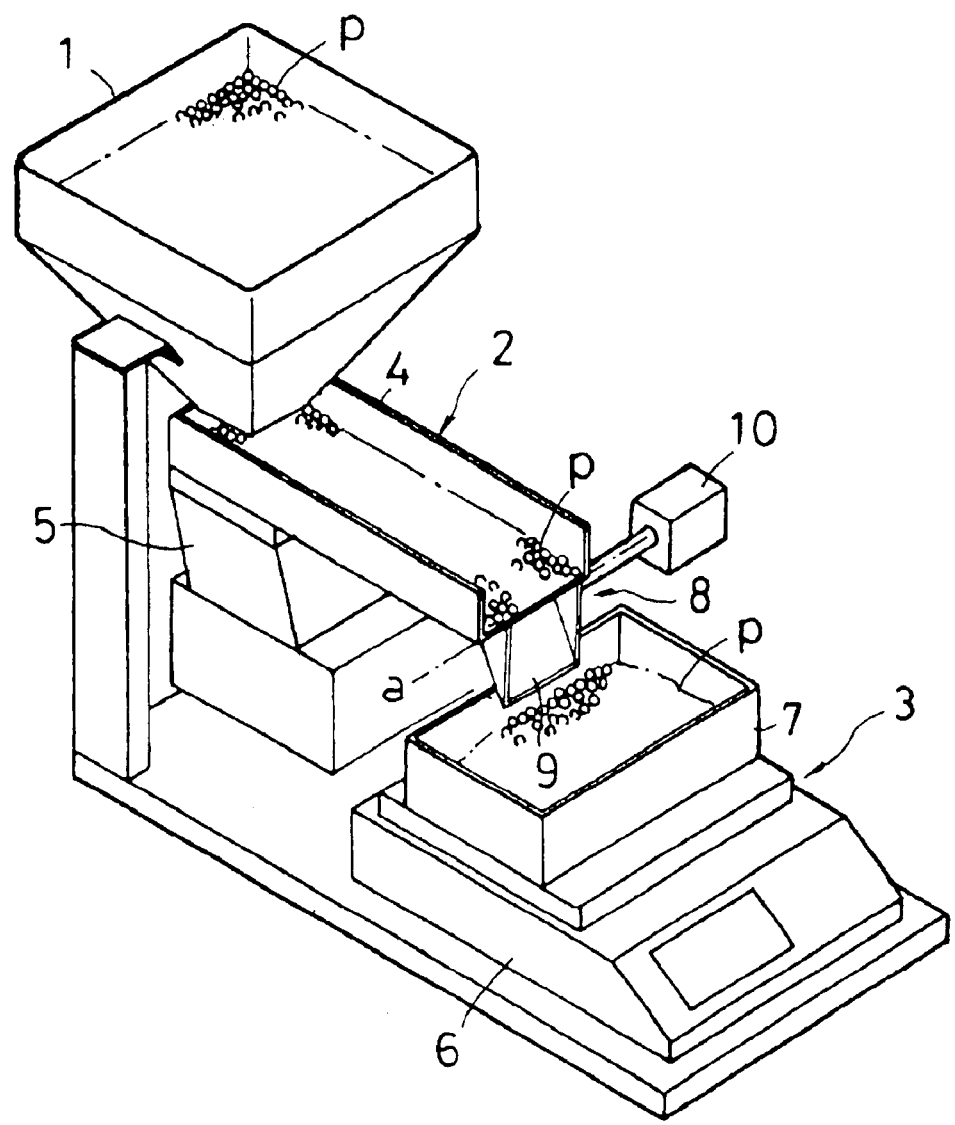
FIG. 2 is a perspective view of the measuring apparatus of FIG. 1 which is operated in a first supplying step.
Figure 3:
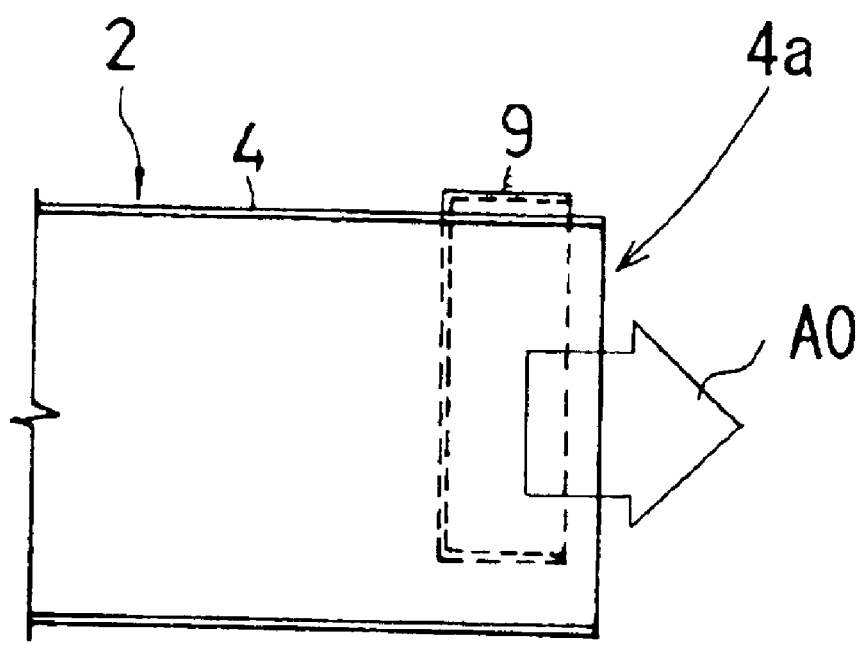
FIG. 3 is a plan view showing an essential part of the measuring apparatus of FIG. 1.

Hereinafter, a method according to preferred embodiments of the present invention and an apparatus for use in this method will be described with reference to the accompanying drawings in detail. FIGS. 1 to 3 illustrate a first supplying step according to a preferred embodiment of the present invention. FIG. 1 is a side view of the whole of a measuring apparatus which carries out a measuring method according to a preferred embodiment of the present invention. FIG. 2 is a perspective view of the whole of the measuring apparatus of FIG. 1 which is operated in the first supplying step. FIG. 3 is a plan view showing an essential part of the measuring apparatus which is operated in the first supplying step.

Figure 4:
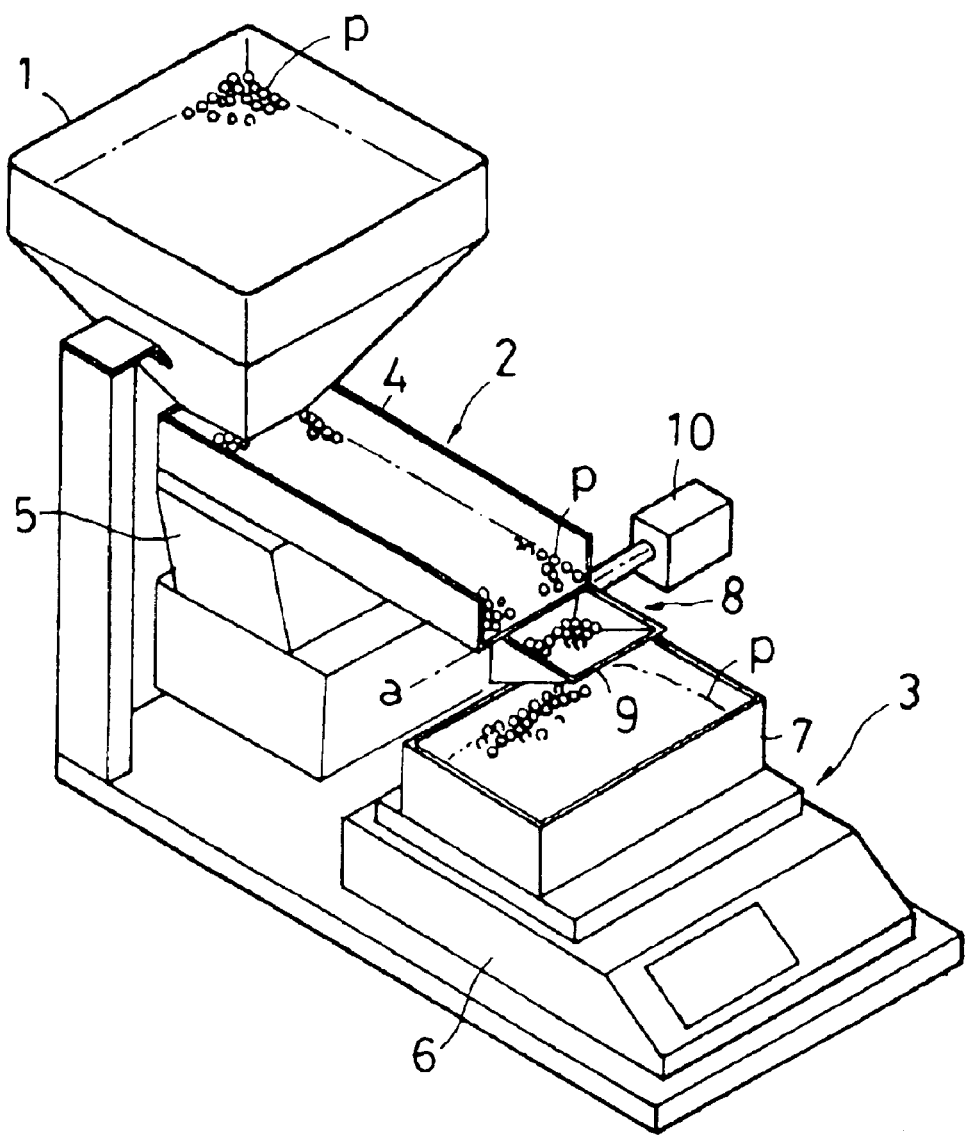
FIG. 4 is a perspective view of the measuring apparatus of FIG. 1 which is operated in a second supplying step.
Figure 5:
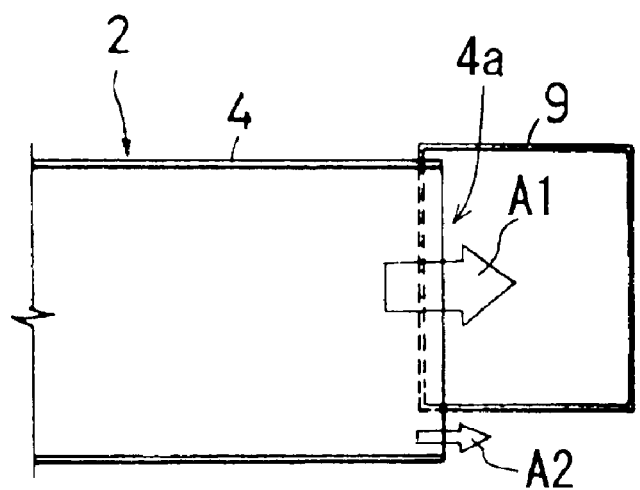
FIG. 5 is a plan view showing an essential part of the measuring apparatus of FIG. 1.

FIGS. 4 and 5 illustrate a second supplying step according to the first preferred embodiment of the present invention. FIG. 4 is a perspective view of the whole of the measuring apparatus of FIG. 1 which is operated in the second supplying step. FIG. 5 is a plan view of the essential part of the measuring apparatus of FIG. 1 which is operated in the second supplying step.

Figure 6:
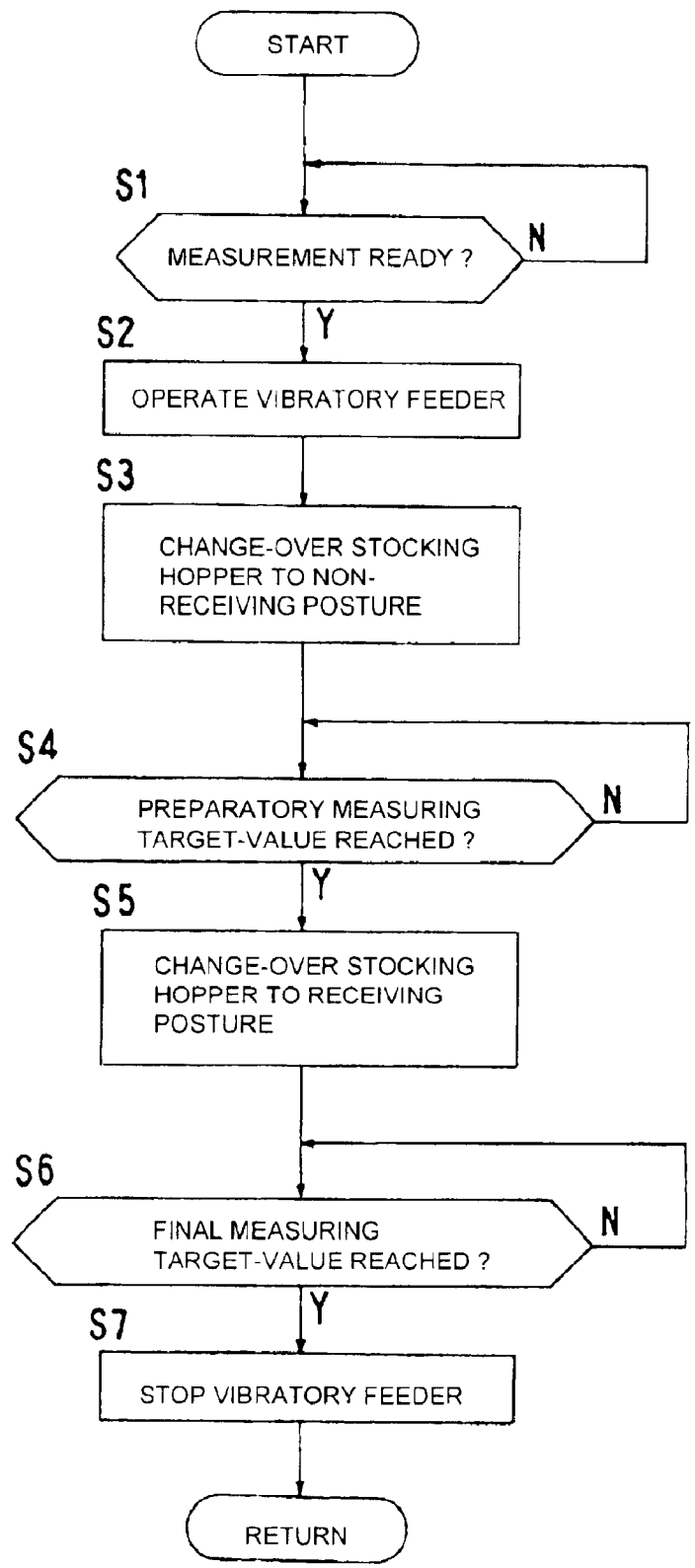
FIG. 6 is a flow chart showing the measurement procedure which is carried out with the measuring apparatus of FIG. 1.
Figure 7:
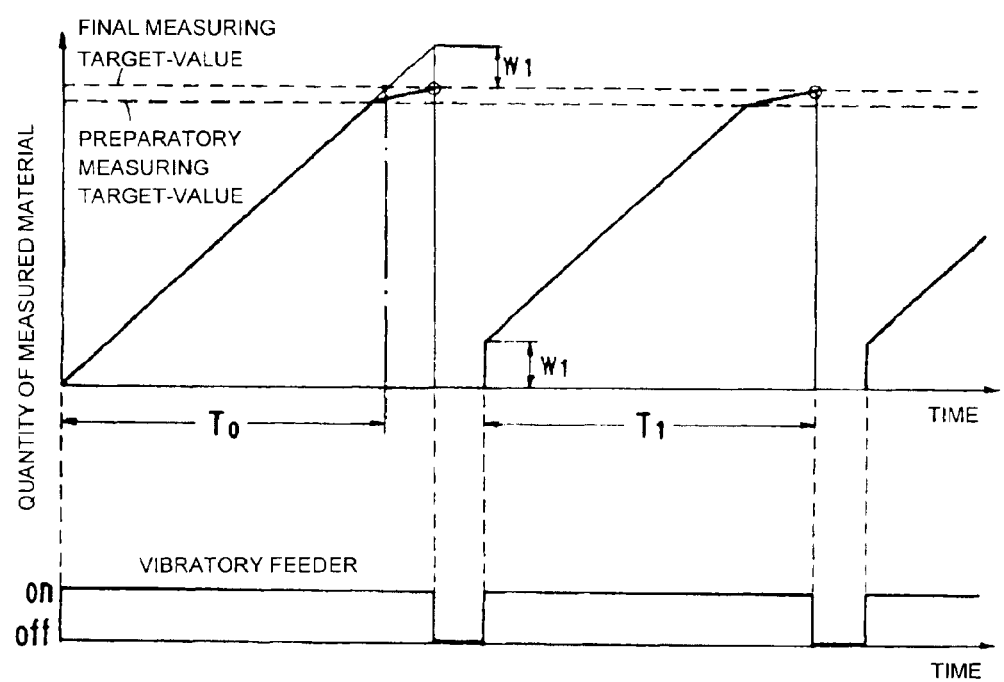
FIG. 7 is a time chart showing the measurement procedure which is carried out with the measuring apparatus of FIG. 1.

FIG. 6 is a flow chart of measuring procedures which are carried out with the measuring apparatus shown in FIG. 1, according to the first preferred embodiment of the present invention. FIG. 7 is a time chart of the measuring procedures.

In FIGS. 1 to 5, a feed-hopper 1, a conveyor 2, a measuring unit 3, a trough 4, a vibratory feeder 5, a measuring device 6, a metering container 7, a stocking mechanism 8, a stocking hopper 9, a driver 10, and a controller 11 are shown.

The feed-hopper 1 functions as a reservoir for reserving material p to be measured and removed, such as chip components or other devices, components or materials. Regarding the conveying unit 2, the material p discharged through the bottom of the feed-hopper 1 and placed on the conveying unit 2 is conveyed at a predetermined conveying rate by use of vibration of the conveying unit 2. In particular, the conveying unit 2 includes a trough 4 and a vibratory feeder 5 which vibrates the trough 4. The trough 4 has a predetermined length which ranges from the lower portion of the feed-hopper 1 to a position right above the measuring unit 3, and has a substantially U-shaped cross-section. The trough 4 functions as a member for conveying and supplying the material p. The end portion of the trough 4 functions as a discharge portion 4a for discharging the material p. According to this preferred embodiment, the material p is continuously conveyed by the conveying unit 2. However, a predetermined quantity of the material p may be conveyed repeatedly and intermittently. Moreover, as the conveying unit, different types of conveyors such as a belt conveyor or other suitable conveyor may be used instead of the above-described vibratory conveying unit 2. Preferably, the material p is dispersed over the width of the trough 4 and conveyed. That is, preferably, the material p is conveyed while it is prevented from being concentrated at a particular portion of the trough 4 in the width direction thereof.

The measuring unit 3 measures the weight of the material p supplied into the measuring unit 3. The measuring unit 3 is provided with an electronic measuring device 6 using a piezoelectric device or other suitable device, and a metering container 7 mounted onto the measuring device 6. The material p is supplied into the metering container 7 mounted onto the measuring device 6, and the weight of the material p is measured in the metering container 7.

A stocking mechanism 8 is disposed between the discharge portion 4a at the end of the conveying unit 2 and the upper part of the metering container 7 of the measuring unit 3. The stocking mechanism 8 receives a portion of the material p conveyed and dropped from the discharge portion 4a, on the way to where the material p is dropping, and reserves a portion of the material p. Thus, the material p is prevented from being supplied into the measuring unit 3. The stocking mechanism 8 includes a stocking hopper 9 and a driver 10.

The stocking hopper 9 can be swung in the forward or backward direction about the transverse shaft a thereof, and has a width slightly smaller than that of an outlet disposed at the end of the trough 4. Moreover, the stocking hopper 9 can be swung by the driver 10, so that the off-state of the hopper 9, i.e., the non-receiving posture in which the stocking hopper 9 is swung to a lower position as shown in FIGS. 1 to 3, and the on-state, i.e., the receiving posture in which the hopper 9 is swung to an upper position as shown in FIGS. 4 and 5 are changed over to each other.

When the stocking hopper 9 is swung to the lower position, i.e., is in the off state, all of the material p discharged from the outlet at the end of the conveying unit 2 is supplied into the metering container 7, as shown by arrow A0 in FIG. 3. On the other hand, when the stocking hopper 9 is swung to the upper position, i.e., is in its on-state, most of the material p discharged from the outlet at the end of the conveying unit 2 is received into the stocking hopper 9. The material p discharged from an outlet portion with a small width that is arranged so as to be distant from the stocking hopper 9 is supplied at a relatively low supplying rate into the metering container 7.

The controller 11 preferably includes a microcomputer, and captures measurement data from the measuring device 6. The controller 11 controls the vibratory feeder 5 and the driver 10 based on the captured measurement data.

The controller includes, in addition to the microcomputer, a data memory and a program memory. Data with respect to a first supplying step and a second supplying step, which will be described below in detail, are stored in the data memory. The data with respect to the first supplying step includes a final measuring target value and a preparatory measuring target value. The final measuring target value is set so that a desired quantity of the material p is measured to be removed. The final measuring target value is set in advance, e.g., by a process controller or the like. The preparatory measuring target value is preferably slightly smaller than the final measuring target value. Moreover, other data is stored in the data memory, if necessary. Program data required to execute respective steps S shown in FIG. 6 is stored in the program memory. The program data can be modified by the process controller or the like, if necessary.

The operation of the measuring apparatus by which a predetermined quantity of the material p is measured to be removed will be described with reference to FIGS. 6 and 7.

First Supplying Step

First, the material p is placed in the feed-hopper 1. At step S1, the controller 11 decides whether preparation for the measurement has been done or not. In the flow chart, Y represents that the preparation is done, and N represents that the preparation is not done. The controller 11, when it decides that the preparation for the measurement is done, causes the vibratory feeder 5 to operate (step S2), and moreover, controls the driver 10 so that the stocking hopper 9 is in the non-receiving position as shown in FIGS. 1 to 3 (step S3). The material p in the feed-hopper 1 is conveyed at a predetermined conveying rate in the trough 4, and is supplied into the metering container 7 of the measuring unit 3. The weight of the material p in the container 7 is measured by the measuring device 6. In the first supplying step, the stocking hopper 9 is in the non-receiving position. Thus, in the first supplying step, all of the material p dropped from the discharge portion 4a at the end of the trough 4 is supplied into the metering container 7 as shown by the arrow A0.

The controller 11 decides whether the quantity of the material p measured as described above reaches the preparatory measuring target value which is smaller than the final measuring target value (step S4). When the controller 11 determines that the quantity reaches the preparatory measuring target value, the controller 11 controls the driver 10 so that the stocking hopper 9 of the stocking mechanism 8 is swung to an upper position to be in the receiving position (step S5). Thus, most of the material p is received for recovery in the stocking hopper 9.

Second Supplying Step

When the stocking hopper 9 is swung to the upper position to have the receiving posture, most of the material p dropped from the discharge portion 4a at the end of the trough 4 of the conveying unit 2, is received in the stocking hopper 9, so that the material p is prevented from being introduced into the metering container 7, as shown by arrow A1. The remaining portion of the material p, not received, i.e., not stopped by the stocking hopper 9, is introduced into the metering container 7, as shown by arrow A2.

In the second supplying step, the controller 11 decides whether the quantity of the material p measured reaches the final measuring target value (step S6). The controller 11, when it decides that the quantity reaches the final measuring target value, causes the vibratory feeder 5 to stop (step S7).

As a result, the predetermined quantity of the material p is supplied into the metering container 7. Thus, one cycle of the supplying and removing of the material p is completed.

As is understood from the above-description, according to this preferred embodiment, the supplying rate of the material p at which the material p is supplied into the metering container 7 is large until the quantity of the measured material p reaches the preparatory measuring target value. Thus, the time required for a predetermined quantity of the material p to be supplied to the metering container 7 can be reduced. In addition, when the quantity of the material p supplied into the metering container 7 approaches the final metering target value, the large supplying rate of the material p to be supplied into the metering container 7 is changed over to the very small supplying rate. Thus, the material p can be supplied into the metering container 7 with very high accuracy.

Then, the material p measured as described above is transferred to the subsequent step together with the metering container 7 containing the material p therein, or only the material p is transferred to the subsequent step. Thereafter, the empty metering container 7 is mounted onto the measuring device 6. Thus, the subsequent measurement process is started.

The above-described operation of the measuring apparatus is illustrated in the time chart of FIG. 7. In FIG. 7, w1 represents the weight of the material p received and reserved in the stocking hopper 9 in the second supplying step. In the next measurement, the weight w1 of the material p received for recovery is added when the next measurement is started. Thereby, regarding the second and subsequent measurement, the duration $T_1$ required for one cycle of the measurement is shorter than the duration $T_0$ required for the measurement in which the material p is supplied without being recovered until the quantity of the material p supplied in the metering container 7 reaches the final measuring target value. Moreover, the measurement can be performed with very high accuracy.

Moreover, various preferred embodiments of the present invention may be applied according to the following modes.

Figure 8:
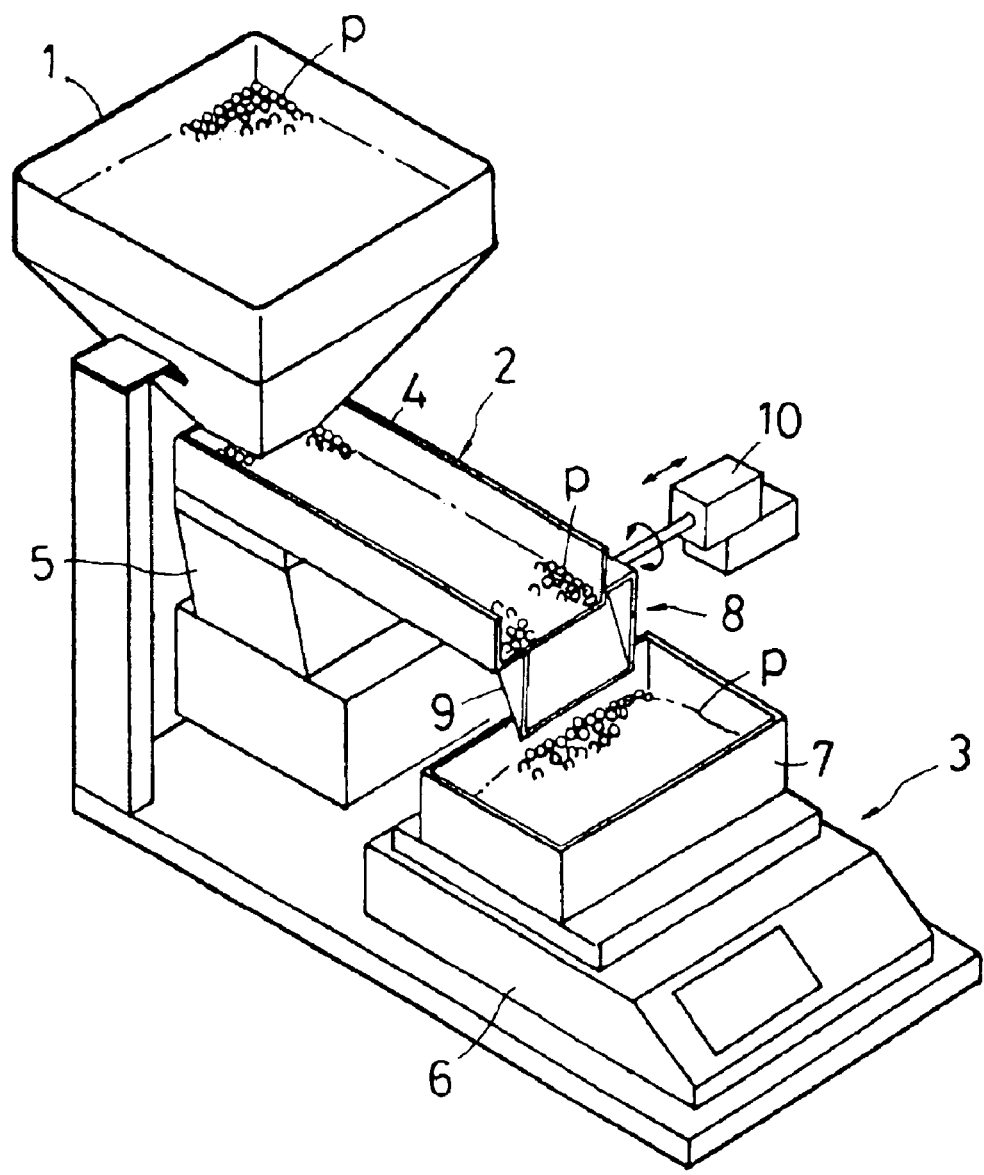
FIG. 8 is a perspective view of a measuring apparatus which carries out a measuring method according to a second preferred embodiment of the present invention.

Referring to FIG. 8, the stocking hopper 9 of the stocking mechanism 8 preferably has a width that is larger than that of the trough 4 of the conveying unit 2 and, moreover, is arranged such that it can be swung in the upper or lower direction, and also can be moved in the transverse direction.

Figure 9A:
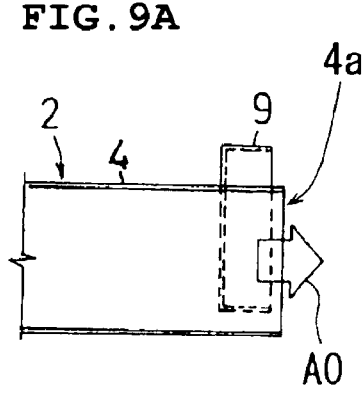
FIGS. 9A, 9B, and 9C are plan views showing an essential part of the measuring apparatus of FIG. 8.
Figure 9B:
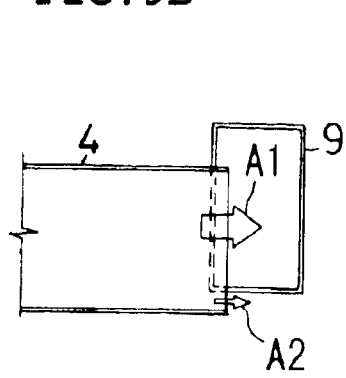
Figure 9C:
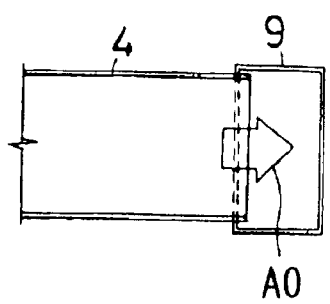
Figure 10:
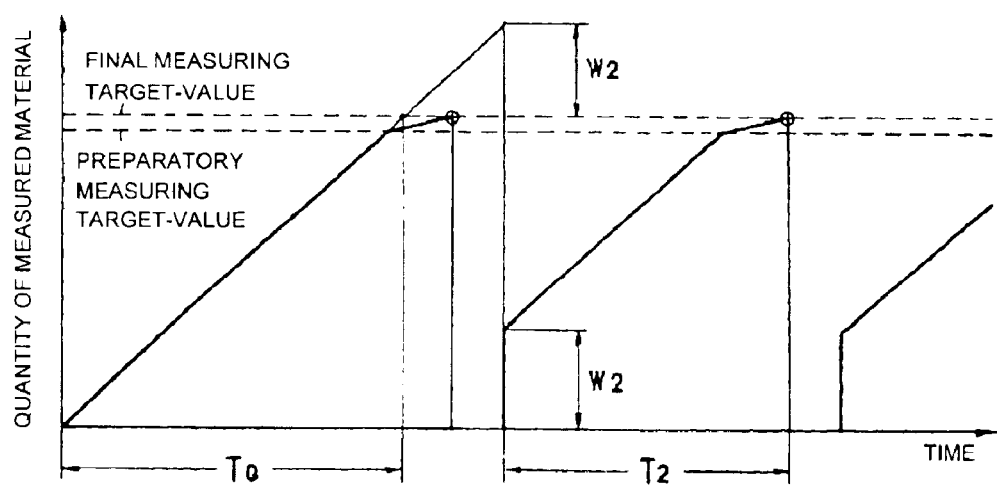
FIG. 10 is a time chart of the measurement procedure which is carried out with the measuring apparatus of FIG. 8.

According to the above-described structure, in the first supplying step which is carried out until the quantity of the material p supplied into the metering container p reaches the preparatory measuring target value, the stocking hopper 9 is swung to a lower position, i.e., is caused to recede and be held in the off-state (non-receiving position), all of the material p conveyed by the conveying unit 2 is supplied into the metering container 7 at a full supplying rate A0. When the quantity of the material p measured in the metering container 7 reaches the preparatory measuring target value, the stocking hopper 9 is swung to an upper position and is held in the on-state (receiving position), as shown in FIG. 9B similarly to the above-described preferred embodiment, so that most of the material p conveyed by the conveying unit 2 is received for recovery in the stocking hopper 9 at a rate A1. Thus, a very small quantity of the material p is supplied into the metering container 7 at a supplying rate A2. When the quantity of the material p measured in the metering container 7 reaches the final measuring target value, the stocking hopper 9 is moved in the transverse direction while the material p continues to be conveyed by the conveying unit 2 and dropped from the discharge portion 4a at the rate that is substantially equal to the full supplying-rate A0. Thus, all of the material p conveyed by the conveying unit 2 is received in the stocking hopper 9. When the subsequent measurement is started, the stocking hopper 9 is swung to a lower position and is held in the off-state. Then, the stocking hopper 9 may be rotated so that the reserved material p is added for the next measurement.

According to the above-described constitution, the weight w2 of the material p received and reserved in the stocking hopper 9 until the next measurement is started is larger than the weight w1 of the material p received and reserved in the above-described preferred embodiment. Therefore, the duration $T_2$ required for one cycle of the subsequent measurement is smaller than the duration $T_1$ required for the above-described measurement by the time corresponding to the difference between the weights w2 and w1.

Figure 11:
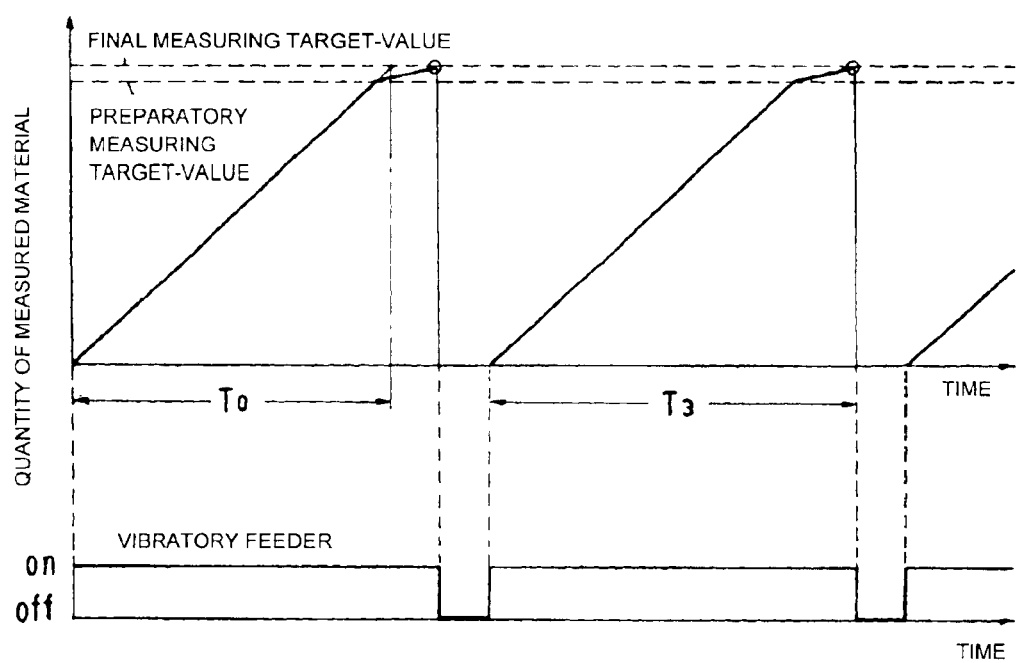
FIG. 11 is a time chart of a comparative example of the measuring apparatus of FIG. 1 or FIG. 8.

Referring to a measuring mode in which a predetermined quantity of the material p is measured to be removed with very high accuracy, a recovery chute, which can be caused to recede, may be provided for the stocking mechanism 8. The material p received through the chute and reserved in a recovery container in the second supplying step is timely restored to the feed-hopper 1. FIG. 11 is a time chart of the operation which is carried out according to the above-described measuring mode. Although the measurement accuracy is high, the duration $T_3$ required for one cycle of the measurement is larger than the duration $T_0$ required for the measurement which is carried out until all of the material p conveyed by the conveying unit 2 is supplied into the metering container 7 at a full supplying-rate until the final measuring target value is reached. Thus, the measurement cannot be carried out with very high accuracy in a short time, in contrast to the method of preferred embodiments of the present invention.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A method of measuring a material in which the material is conveyed by a conveying unit and dropped from a discharge portion of the conveying unit to be supplied into a measuring unit arranged under the discharge portion, and is measured by the measuring unit, the method comprising:

a first supplying step of supplying the material from the discharge portion into the measuring unit until the quantity of the material measured by the measuring unit reaches a preparatory measuring target value that is relatively small compared to a final measuring target-value of the material; and a second supplying step of receiving a portion of the material to be supplied through the discharge portion into the measuring unit on a path where the material is dropping for recovery, whereby the material is supplied through the discharge portion into the measuring unit at a supplying rate that is smaller than that in the first supplying step; wherein the material is stopped from being supplied through the discharge portion into the measuring unit when the quantity of the material measured by the measuring unit reaches the final measuring target-value.

2. The method according to claim 1, wherein the material comprises electronic chip components.

3. The method according to claim 1, wherein the material is conveyed in the first supplying step by vibrating the material.

4. The method according to claim 1, wherein during the first supplying step, the measuring unit measures the weight of the material to determine whether the quantity of the material has reached the preparatory measuring target value.

5. The method according to claim 1, wherein during the first supplying step, a stocking hopper is located in a non-receiving position, and when the quantity of material measured by the measuring unit reaches the preparatory measuring target value, the stocking hopper is moved to a receiving position.

6. A measuring apparatus comprising:

a conveying unit having a conveying member for conveying material to be measured, and a discharge portion from which the material conveyed by the conveying member is discharged;

a measuring unit for measuring the material dropped from the discharge portion and supplied therein;

a stocking mechanism arranged between the discharge portion and the measuring unit, the stocking mechanism being controlled so that an off-state and an on-state of the stocking mechanism are changed over to each other, the off-state being such that the stocking mechanism recedes from a path along which the material drops so that the dropping of the material is not disturbed, the on-state being such that the stocking mechanism advances into the path along which the material drops so that a portion of the material can be received for recovery;

a controller adapted to capture measurement data obtained in the measuring unit and to control the stocking mechanism based on the data; wherein the controller controls the stocking mechanism to be set in the off-state until the quantity of the material measured by the measuring unit reaches a preparatory measuring target value that is smaller than a final measuring target-value of the material; and the controller controls the stocking mechanism to be set in the on-state after the quantity of the material measured by the measuring unit reaches the preparatory measuring target value, and the controller stops the material from being supplied to the measuring unit through the discharge portion when the quantity of the material measured by the measuring unit reaches the final measuring target value.

7. The measuring apparatus according to claim 6, wherein the material comprises electronic chip components.

8. The measuring apparatus according to claim 6, wherein the conveying unit vibrates the material for conveying the material to the discharge portion.

9. The measuring apparatus according to claim 6, wherein the measuring unit measures the weight of the material to determine whether the quantity of the material has reached the preparatory measuring target value.

10. The measuring apparatus according to claim 6, wherein the measuring unit includes an electronic measuring device and a metering container for measuring the weight of the material.

11. The measuring apparatus according to claim 6, wherein the stocking mechanism includes a stocking hopper and a driver for moving the stocking hopper from a non-receiving posture in which the stocking hopper is in a lower position to a receiving posture in which the hopper is in an upper position.

12. The measuring apparatus according to claim 11, wherein when the stocking hopper is in the lower position, all of the material discharged from the conveying unit is supplied into a metering container of the measuring unit.

13. The measuring apparatus according to claim 11, wherein when the stocking hopper is in the upper position, most of the material discharged from the conveying unit is received into a stocking hopper of the stocking mechanism.

14. The measuring apparatus according to claim 6, wherein the controller includes a microcomputer and is arranged to receive measurement data from the measuring unit.

15. The measuring apparatus according to claim 6, wherein the controller includes a microcomputer, a data memory and a program memory, wherein data relating to the final measuring target value and the preparatory measuring target value are stored in the data memory and data for operating the controller are stored in the program memory.

* * * * *